US008831833B2

(12) United States Patent
Hayashi et al.

(10) Patent No.: US 8,831,833 B2
(45) Date of Patent: Sep. 9, 2014

(54) VEHICLE

(75) Inventors: Koki Hayashi, Tokyo (JP); Yuji Takakura, Tokyo (JP); Shinji Yamamoto, Tokyo (JP)

(73) Assignee: Equos Research Co., Ltd., Tokyo (JP)

( * ) Notice: Subject to any disclaimer, the term of this patent is extended or adjusted under 35 U.S.C. 154(b) by 0 days.

(21) Appl. No.: 13/977,942

(22) PCT Filed: Jan. 18, 2012

(86) PCT No.: PCT/JP2012/050884
§ 371 (c)(1),
(2), (4) Date: Jul. 2, 2013

(87) PCT Pub. No.: WO2012/099138
PCT Pub. Date: Jul. 26, 2012

(65) Prior Publication Data
US 2013/0297152 A1    Nov. 7, 2013

(30) Foreign Application Priority Data
Jan. 18, 2011    (JP) ................................ 2011-007669

(51) Int. Cl.
*B62D 9/04*       (2006.01)
*B62K 5/10*       (2013.01)
*B60G 17/015*     (2006.01)
*B62K 5/025*      (2013.01)
*B60G 17/0195*    (2006.01)

(52) U.S. Cl.
CPC .............. *B62D 9/04* (2013.01); *B60G 2300/45* (2013.01); *B62K 5/10* (2013.01); *B60G 2400/204* (2013.01); *B60G 17/015* (2013.01); *B62K 5/025* (2013.01); *B60G 2400/0533* (2013.01); *B60G 17/0195* (2013.01); *B60G 2300/122* (2013.01); *B60G 2400/104* (2013.01)
USPC .......................................................... 701/42

(58) Field of Classification Search
CPC .......................... B60G 17/019; B60W 2520/00
USPC .......................................................... 701/42
See application file for complete search history.

(56) References Cited

U.S. PATENT DOCUMENTS 5,408,411 A * 4/1995 Nakamura et al. ............... 701/48
6,138,066 A * 10/2000 Guo et al. ........................ 701/38
(Continued)

FOREIGN PATENT DOCUMENTS

JP    A-5-24422     2/1993
JP    A-9-20217     1/1997
(Continued)

OTHER PUBLICATIONS
Jul. 23, 2013 International Preliminary Report on Patentability issued in International Application No. PCT/JP2012/050884.

*Primary Examiner* — Thomas Tarcza
*Assistant Examiner* — Alex C Dunn
(74) *Attorney, Agent, or Firm* — Oliff PLC

(57) ABSTRACT

The vehicle includes a vehicle body having a steering section and a drive section connected together; a steerable wheel which steers the vehicle body; a drive wheel which drives the vehicle body; an inclination actuator apparatus for inclining the steering section or the drive section in a turning direction; a plurality of sensors which detect lateral accelerations; yaw angular velocity detection means; vehicle speed detection means; and a control apparatus which controls the inclination of the vehicle body by controlling the inclination actuator apparatus. The control apparatus performs feedback control on the basis of the lateral accelerations, calculates a link angular velocity predicted value from the derivative value of the yaw angular velocity and the vehicle speed, and controls the inclination of the vehicle body by performing feedforward control while using the calculated link angular velocity predicted value.

4 Claims, 13 Drawing Sheets

(56) References Cited

U.S. PATENT DOCUMENTS

| | | |
|---|---|---|
| 6,471,161 B1* | 10/2002 | D'Ambrosio et al. .......... 244/164 |
| 6,829,524 B2* | 12/2004 | Chee ................................ 701/1 |
| 7,239,949 B2* | 7/2007 | Lu et al. ......................... 701/45 |
| 7,418,372 B2* | 8/2008 | Nishira et al. .................... 703/2 |
| 7,702,442 B2* | 4/2010 | Takenaka ........................ 701/48 |
| 8,311,729 B2* | 11/2012 | Saito et al. .................... 701/300 |
| 8,437,890 B2* | 5/2013 | Anderson et al. ................ 701/3 |
| 8,543,261 B2* | 9/2013 | Anderson et al. ................ 701/3 |
| 2007/0208483 A1* | 9/2007 | Rabin ............................. 701/72 |
| 2010/0023220 A1* | 1/2010 | Nakashima et al. ............ 701/42 |
| 2010/0032914 A1 | 2/2010 | Hara et al. |
| 2011/0241863 A1* | 10/2011 | Ono et al. ...................... 340/439 |
| 2013/0274985 A1* | 10/2013 | Lee et al. ........................ 701/23 |

FOREIGN PATENT DOCUMENTS

| | | |
|---|---|---|
| JP | A-2008-155671 | 7/2008 |
| JP | A-2010-58783 | 3/2010 |

* cited by examiner

F I G. 2
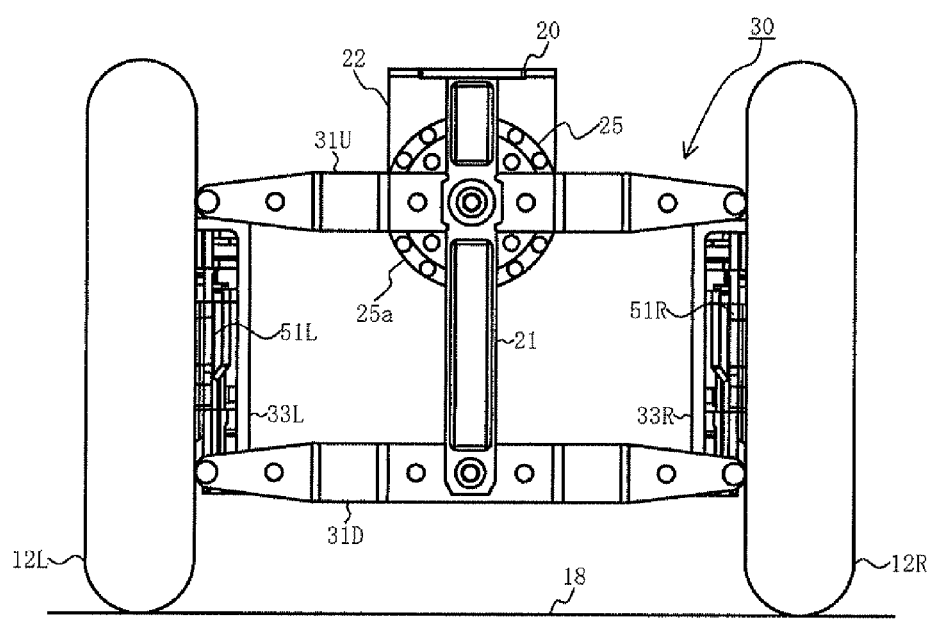

(a)

(b)

F I G. 8
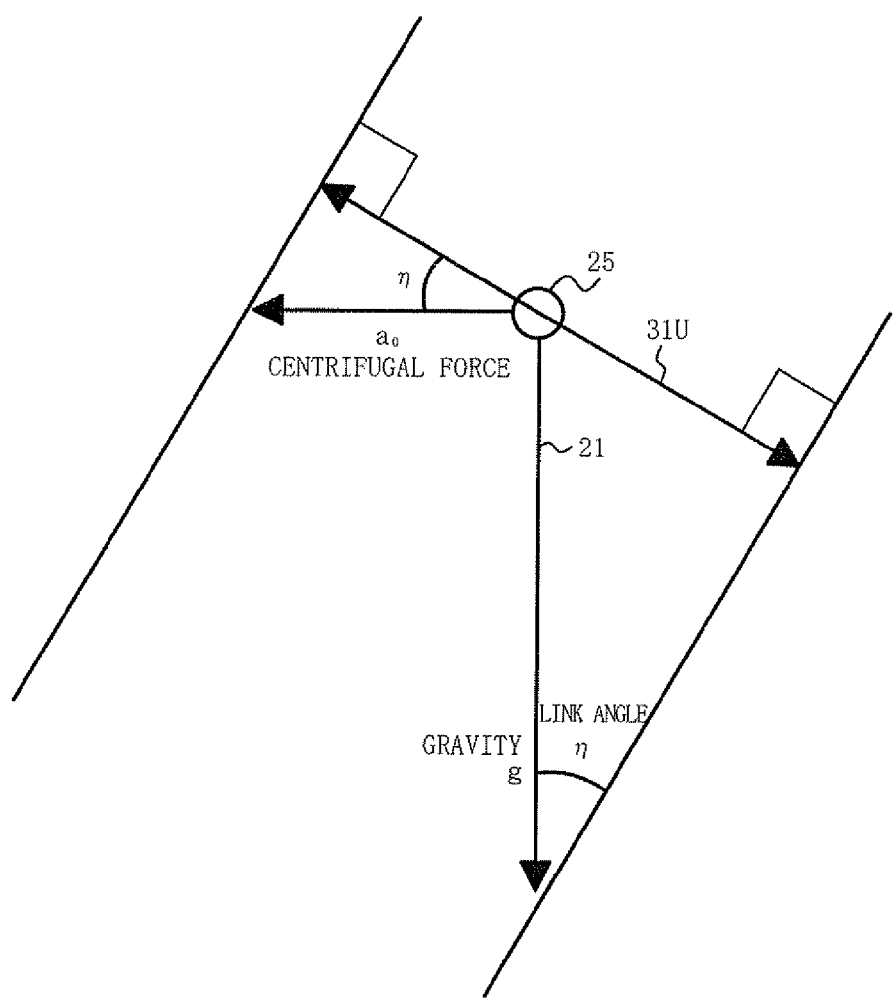

VEHICLE

TECHNICAL FIELD

The present invention relates to a vehicle which has at least a pair of wheels; i.e., left and right wheels.

BACKGROUND ART

In recent years, in view of exhaustion of energy resources, reduction of fuel consumption of vehicles has been strongly demanded. Meanwhile, due to a drop in price and other factors, the number of peoples who own vehicles increases, and a recent trend is that one person has one vehicle. Therefore, there has been a problem in that a driver solely occupies a vehicle which can carry four people, whereby energy is wasted uselessly. The most efficient way of reducing the fuel consumption of a vehicle through reduction of the size thereof is to configure the vehicle as a three-wheel or four-wheel single seater.

However, depending on the travel state, the stability of a vehicle may lower. In order to overcome this, there has been proposed a technique of inclining the body of a vehicle in a lateral direction to thereby improve the stability of the vehicle at the time of turning (see, for example, Patent Document 1).

PRIOR ART DOCUMENT

Patent Document

Patent Document 1: Japanese Patent Application Laid-Open (kokai) No. 2008-155671

DISCLOSURE OF THE INVENTION

Problem to be Solved by the Invention

In the above-mentioned conventional vehicle, in order to improve turning performance, the vehicle body is inclined toward the inner side of a turning locus (hereinafter referred to as the "turning-locust inner side"). However, an operation of inclining the vehicle body is difficult, and its turning performance is low. Therefore, the vehicle occupant has uncomfortable sensation and/or becomes uneasy.

The present invention has solved the problem of the above-mentioned conventional vehicle, and its object is to provide a vehicle in which a link angular velocity predicted value is calculated from a yaw angular acceleration and a vehicle speed, and the inclination angle of the vehicle body is controlled to an angle such that a balance is achieved between the centrifugal force toward the outer side of a turning locus (hereinafter referred to as the "turning-locust outer side") and the force of gravity. Thus, even when the attitude of the vehicle body changes or the road surface inclines leftward or rightward, the acceleration component in the lateral direction becomes zero, and forces act on the vehicle body and an occupant in a direction parallel to the vertical axis of the vehicle body. Therefore, it is possible to provide a highly safe vehicle which can maintain the stability of the vehicle body, which has an improved turning performance, and which can realize a stable travel state in which the occupant can enjoy a comfortable ride without feeling any unnatural sensation.

Means for Solving the Problems

In order to achieve the object, the present invention provides a vehicle comprising a vehicle body which includes a steering section and a drive section connected together; a steerable wheel which is rotatably mounted to the steering section and which steers the vehicle body; a drive wheel which is rotatably mounted to the drive section and which drives the vehicle body; an inclination actuator apparatus for inclining the steering section or the drive section in a turning direction; a plurality of sensors which detect lateral accelerations acting on the vehicle body; yaw angular velocity detection means for detecting yaw angular velocity of the vehicle body; vehicle speed detection means for detecting vehicle speed; and a control apparatus which controls the inclination of the vehicle body by controlling the inclination actuator apparatus. The control apparatus performs feedback control on the basis of the lateral accelerations detected by the plurality of sensors, calculates a link angular velocity predicted value from a derivative value of the yaw angular velocity detected by the yaw angular velocity detection means and the vehicle speed detected by the vehicle speed detection means, and controls the inclination of the vehicle body by performing feedforward control while using the calculated link angular velocity predicted value.

Effects of the Invention

According to the configuration of claim 1, the inclination angle of the vehicle body can be controlled such that a balance is achieved between the centrifugal force toward the turning-locus outer side and the force of gravity, and an unintended vehicle body inclination is not produced. Therefore, forces act on the vehicle body and the occupant in a direction parallel to the vertical axis of the vehicle body, whereby it becomes possible to realize a stable travel state in which the occupant enjoys a comfortable ride without feeling any unnatural sensation.

According to the configurations of claims 2 and 3, unnecessary acceleration components can be removed. Therefore, it is possible to eliminate the influence of the road surface condition and prevent the generation of vibration, divergence, etc. of a control system. Accordingly, control responsiveness can be improved by increasing the control gain of a vehicle inclination control system.

BRIEF DESCRIPTION OF THE DRAWINGS

FIG. 2 View showing the structure of a link mechanism of the vehicle according to the embodiment of the present invention.

FIG. 8 Illustration relating to the embodiment of the present invention and showing a model used for describing the link angle of the vehicle body.

MODE FOR CARRYING OUT THE INVENTION

An embodiment of the present invention will now be described in detail with reference to the drawings.

Figure 1:
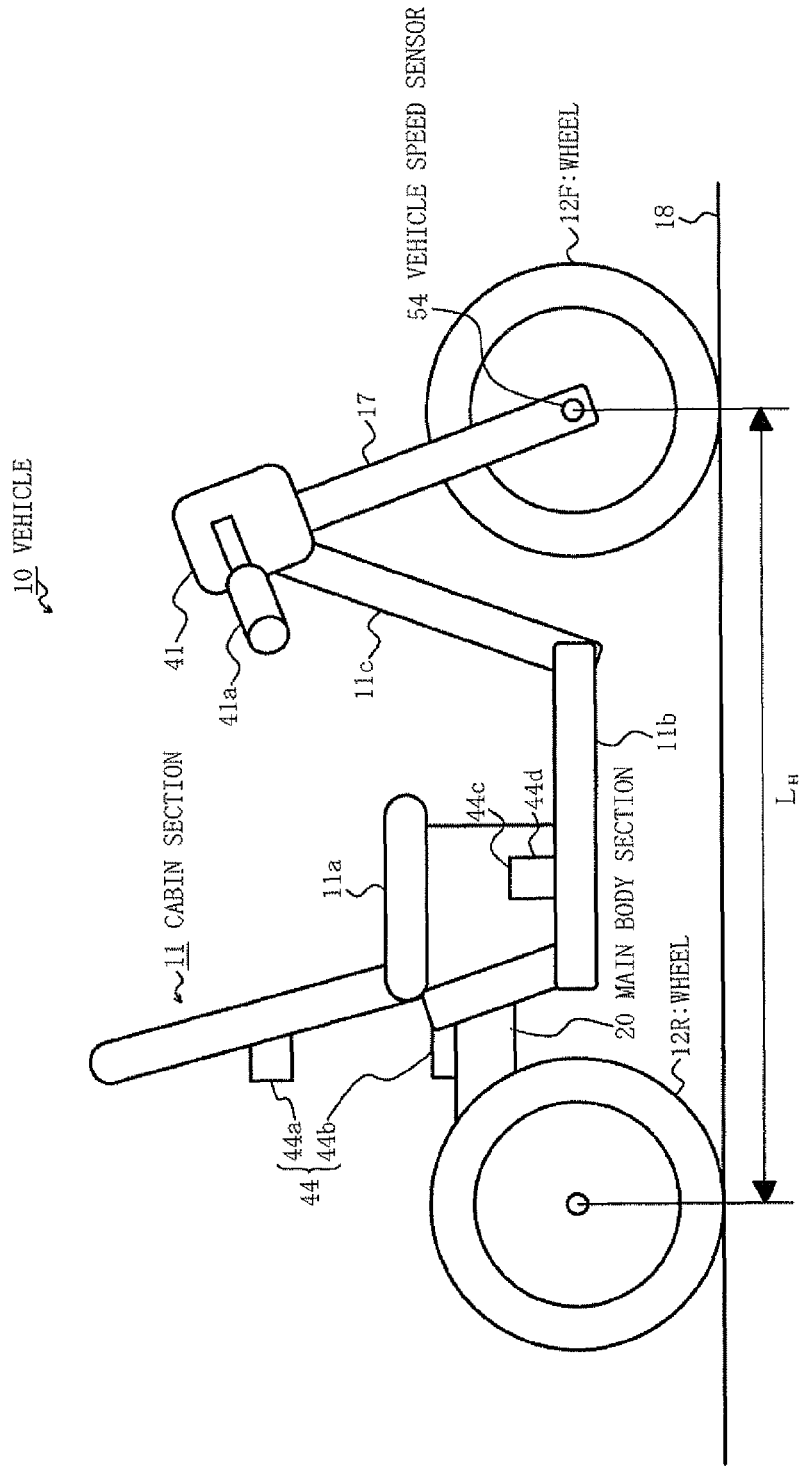
FIG. 1 Right side view showing the structure of a vehicle according to an embodiment of the present invention.
Figure 3:
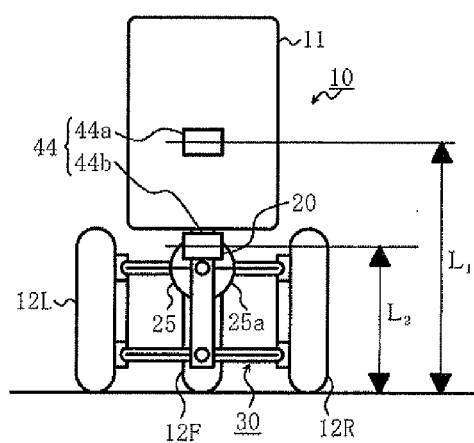
FIG. 3 Rear view showing the structure of the vehicle according to the embodiment of the present invention.
Figure 3:
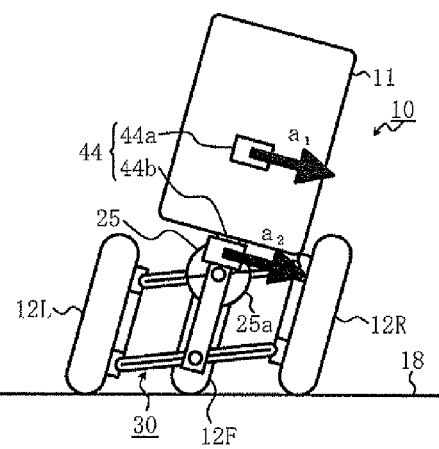

FIG. 1 is a right side view showing the structure of a vehicle according to the embodiment of the present invention. FIG. 2 is a view showing the structure of a link mechanism of the vehicle according to the embodiment of the present invention. FIG. 3 is a rear view showing the structure of the vehicle according to the embodiment of the present invention. Notably, in FIG. 3, (a) is a view showing a state in which the vehicle body is upright, and (b) is a view showing a state in which the vehicle body inclines.

In these drawings, reference numeral 10 denotes the vehicle according to the present embodiment. The vehicle 10 has a main body section 20, which serves as a drive section of the vehicle body; a cabin section 11, which serves as a steering section into which an occupant gets and in which the occupant steers the vehicle; a front wheel 12F which is disposed at the front of the vehicle body to be located at the center in the width direction and which serves as a steerable wheel; and left and right rear wheels 12L and 12R which are disposed at the rear of the vehicle and which serve as drive wheels. Further, the vehicle 10 includes a link mechanism 30 which supports the left and right wheels 12L and 12R and which serves as a lean mechanism (i.e., a vehicle body inclining mechanism) for inclining (i.e., leaning) the vehicle body leftward or rightward; and a link motor 25 which serves as an inclination actuator apparatus which is an actuator for operating the link mechanism 30. Notably, the vehicle 10 may be a three-wheel vehicle which has two (left and right) front wheels and a single rear wheel, or a four-wheel vehicle which has two (left and right) front wheels and two (left and right) rear wheels. However, in the present embodiment, as shown in the drawings, the vehicle 10 is a three-wheel vehicle which has one front wheel and two (left and right) rear wheels.

At the time of turning, the angles of the left and right wheels 12L and 12R in relation to a road surface 18; i.e., the camber angle thereof, is changed, and the vehicle body including the cabin section 11 and the main body section 20 is inclined toward the inner wheel located on the inner side of a turning locus, whereby turning performance is improved, and the occupant can enjoy a comfortable ride. Namely, the vehicle 10 can incline the vehicle body in the lateral direction (left-right direction) too. Notably, in the example shown in FIGS. 2 and 3(a), the left and right wheels 12L and 12R stand upright on the road surface 18; i.e., the camber angle is 0 degree. Also, in the example shown in FIG. 3(b), the left and right wheels 12L and 12R incline rightward on the road surface 18; i.e., a camber angle is provided.

The link mechanism 30 includes a left vertical link unit 33L which supports the left wheel 12L and a left rotational drive apparatus 51L which is composed of an electric motor or the like and which supplies drive force to the wheel 12L; a right vertical link unit 33R which supports the right wheel 12R and a right rotational drive apparatus 51R which is composed of an electric motor or the like and which supplies drive force to the wheel 12R; an upper lateral link unit 31U which connects together the upper ends of the left and right vertical link units 33L and 33R; a lower lateral link unit 31D which connects together the lower ends of the left and right vertical link units 33L and 33R; and a central vertical member 21 whose upper end is fixed to the main body section 20 and which extends in the vertical direction. The left and right vertical link units 33L and 33R are rotatably connected to the upper and lower lateral link units 31U and 31D. Central portions of the upper and lower lateral link units 31U and 31D are rotatably connected to the central vertical member 21. Notably, in the case where the left and right wheels 12L and 12R, the left and right rotational drive apparatuses 51L and 51R, the left and right vertical link units 33L and 33R, and the upper and lower lateral link units 31U and 31D are collectively described, they are referred to as the wheel 12, the rotational drive apparatus 51, the vertical link unit 33, and the lateral link unit 31, respectively.

The rotational drive apparatus 51, which serves as a drive actuator apparatus, is a so-called in-wheel motor. The in-wheel motor has a body (stator) fixed to the vertical link unit 33, and a rotation shaft (rotor) which is rotatably attached to the body and which is connected the axle of the wheel 12. The wheel 12 is rotated as a result of rotation of the rotation shaft. Notably, the rotational drive apparatus 51 may be a motor of a type other than the in-wheel type.

The link motor 25 is a rotary-type electric actuator including an electric motor or the like. The link motor 25 has a cylindrical body (stator) and a rotation shaft (rotor) rotatably attached to the body. The body is fixed to the main body section 20 through a mounting flange 22. The rotation shaft is fixed to the upper lateral link unit 31U of the link mechanism 30. Notably, the rotation shaft of the link motor 25 functions as an inclination shaft for inclining the main body section 20, and is coaxial with a rotation shaft at a connection portion between the central vertical member 21 and the upper lateral link unit 31U. When the link motor 25 is driven so as to rotate its rotation shaft relative to the body, the upper lateral link unit 31U rotates relative to the main body section 20 and the central vertical member 21 fixed to the main body section 20, whereby the link mechanism 30 operates; i.e., bends and stretches. As a result, the main body section 20 can be inclined. Notably, the link motor 25 may be used in such a manner that its rotation shaft is fixed to the main body section 20 and the central vertical member 21, and its body is fixed to the upper lateral link unit 31U.

The link motor 25 has a link angle sensor 25a which detects changes in the link angle of the link mechanism 30. The link angle sensor 25a is a rotational angle sensor for detecting the rotational angle of the rotation shaft relative to the body in the link motor 25, and is composed of, for example, a resolver, encoder, or the like. As described above, when the link motor 25 is driven so as to rotate its rotation shaft relative to the body, the upper lateral link unit 31U rotates relative to the main body section 20 and the central vertical member 21 fixed to the main body section 20. Therefore, changes in the angle of the upper lateral link unit 31U relative to the central vertical member 21 (i.e., changes in the link angle) can be detected by detecting the rotational angle of the rotation shaft relative to the body.

The link motor 25 includes an unillustrated lock mechanism for non-rotatably fixing the rotation shaft to the body. It is desired that the lock mechanism be a mechanical structure which does not consume electric power during a period during which it non-rotatably fixes the rotation shaft to the body. The rotation shaft can be non-rotatably fixed to the body, by the lock mechanism, at a predetermined angel relative to the body.

The cabin section 11 is connected to the front end of the main body section 20 through an unillustrated connection portion. The connection portion may have a function of connecting the cabin section 11 and the main body section 20 such that they can move relative to each other in a predetermined direction.

The cabin section 11 includes a seat 11a, a foot rest 11b, and a windscreen 11c. The seat 11a is a portion where the occupant seats when he or she operates the vehicle 10 to travel. The foot rest 11b is a portion for supporting the feet of the occupant, and is provided on the front side (on the right side in FIG. 1) of the seat 11a to be located below the seat 11a.

An unillustrated battery apparatus is disposed on the rear side or lower side of the cabin section 11 or within the main body section 20. The battery apparatus is an energy supply source for the rotational drive apparatus 51 and the link motor 25. Also, an unillustrated control apparatus, an inverter apparatus, various sensors, etc. are accommodated on the rear side or lower side of the cabin section 11 or within the main body section 20.

A maneuvering apparatus 41 is disposed on the front side of the seat 11a. Members necessary for maneuvering the vehicle 10, such as a handle bar 41a, which serves as a steering apparatus, meters such as a speed meter, indicators, and switches, are disposed on the maneuvering apparatus 41. The occupant instructs the travel state of the vehicle 10 (for example, travel direction, travel speed, turning direction, turning radius, etc.) by operating the handle bar 41a and other members. In place of the handle bar 41a, a steering apparatus of a different type, such as a steering wheel, a jog dial, a touch panel, or a push button, may be used as a steering apparatus, which is means for outputting a demanded turning amount of the vehicle body, which is the amount of turning demanded by the occupant.

The wheel 12F is connected to the cabin section 11 through a front wheel fork 17 which is a portion of a suspension apparatus. The suspension apparatus is similar to a suspension apparatus for a front wheel which is used in, for example, a common motorcycle, bicycle, or the like. For example, the front wheel fork 17 is a telescopic-type fork which includes a spring. Like a common motorcycle, bicycle, or the like, the wheel 12F, which serves as a steerable wheel, changes the steering angle in accordance with the operation of the handle bar 41a by the occupant, whereby the travel direction of the vehicle 10 changes.

Specifically, the handle bar 41a is connected to the upper end of an unillustrated steering shaft member, and the upper end of the front wheel fork 17 is connected to the lower end of the steering shaft member. The steering shaft member is rotatably mounted to an unillustrated frame member of the cabin section 11 in an inclined state such that the upper end of the steering shaft member is located rearward of the lower end thereof. The distance between the axle of the front wheel 12F and the axles of the left and right rear wheels 12L and 12R; i.e., the wheel base is represented by $L_H$.

A vehicle speed sensor 54, which serves as vehicle speed detection means for detecting vehicle speed (travel speed of the vehicle 10), is disposed at the lower end of the front wheel fork 17, which supports the axle of the wheel 12F. The vehicle speed sensor 54 is a sensor for detecting the vehicle speed on the basis of the rotational speed of the wheel 12F, and is composed of an encoder, etc.

In the present embodiment, the vehicle 10 has a lateral acceleration sensor section 44. The lateral acceleration sensor section 44 is composed of a common acceleration sensor, a gyro sensor, etc., and detects lateral acceleration of the vehicle 10; i.e., acceleration in the lateral direction (the left-right direction in FIG. 3), which corresponds to the width direction of the vehicle body.

At the time of turning, the vehicle 10 inclines the vehicle body toward the turning-locust inner side for stable travel. Therefore, the inclination angle of the vehicle body is controlled such that a balance is achieved between a centrifugal toward the turning-locust outer side at the time of turning and the force of gravity. Such control makes it possible to always maintain the vehicle body in a horizontal state, for example, even when the road surface 18 inclines in a direction perpendicular to the travel direction (leftward or rightward in relation to the travel direction). Thus, it can be seen that the force of gravity always acts on the vehicle body and the occupant downward in the vertical direction. Therefore, unnatural sensation is mitigated, and the stability of the vehicle 10 improved.

In view of the above, in the present embodiment, the lateral acceleration sensor section 44 is attached to the vehicle body in order to detect the acceleration of the inclining vehicle body in the lateral direction, and feedback control is performed such that the output of the lateral acceleration sensor section 44 becomes zero. Thus, the vehicle body can be inclined to an inclination angle at which a balance is achieved between the centrifugal force acting on the vehicle body at the time of turning and the force of gravity. Also, even when the road surface 18 inclines in a direction perpendicular to the travel direction, the inclination angle of the vehicle body can be controlled such that the vehicle body becomes vertical. Notably, the lateral acceleration sensor section 44 is disposed at the center of the vehicle body in the width direction; i.e., is disposed to be located on the vertical axis of the vehicle body.

However, in the case where the lateral acceleration sensor section 44 is composed of one lateral acceleration sensor, unnecessary accelerations component may be detected. For example, only one of the left and right wheels 12L and 12R may fall into a hollow of the road surface 18 while the vehicle 10 is travelling. In such a case, since the vehicle body inclines, the lateral acceleration sensor section 44 moves in a circumferential direction and detects an acceleration in the circumferential direction. Namely, acceleration components which do not originate directly from the centrifugal force or the force of gravity; i.e., unnecessary acceleration components are detected.

Also, the vehicle 10 includes portions, such as the tire portions of the wheels 12L and 12R, which have elasticity and function as springs, and also has unavoidable plays at connection portions of various members, etc. Therefore, the lateral acceleration sensor section 44 is considered to be attached to the vehicle body via unavoidable plays and springs, and the lateral acceleration sensor section 44 detects accelerations produced by the plays and deformation of the springs as unnecessary acceleration components.

Such unnecessary acceleration components may deteriorate the control performance of the vehicle inclination control system. For example, when the control gain of the vehicle inclination control system is increased, vibration, divergence, etc. of the control system due to the unnecessary acceleration components are generated. Therefore, it becomes impossible to increase the control gain so as to improve responsiveness.

In view of the above, in the present embodiment, the lateral acceleration sensor section 44 is composed of a plurality of lateral acceleration sensors provided at different heights. In the example shown in FIGS. 1 and 3, the lateral acceleration sensor section 44 is composed of two lateral acceleration sensors; i.e., a first lateral acceleration sensor 44*a* and a second lateral acceleration sensor 44*b*. The first lateral acceleration sensor 44*a* and the second lateral acceleration sensor 44*b* are disposed at vertical positions which differ from each other. Unnecessary acceleration components can be removed effectively by properly selecting the positions of the first lateral acceleration sensor 44*a* and the second lateral acceleration sensor 44*b*.

Specifically, as shown in FIG. 3(*a*), the first lateral acceleration sensor 44*a* is disposed on the back surface of the cabin section 11 such that the distance from the road surface 18; i.e., its height, becomes $L_1$. The second lateral acceleration sensor 44*b* is disposed on the back surface of the cabin section 11 or the upper surface of the main body section 20 such that the distance from the road surface 18; i.e., its height, becomes $L_2$. Notably, the heights $L_1$ and $L_2$ satisfy a relation $L_1 > L_2$. When as shown in FIG. 3(*b*) the vehicle 10 turns in a state in which the vehicle body inclines toward the turning-locus inner side (the right side in the drawing), the first lateral acceleration sensor 44*a* detects an acceleration in the lateral direction and outputs a detection value $a_1$, and the second lateral acceleration sensor 44*b* detects an acceleration in the lateral direction and outputs a detection value $a_2$. Notably, strictly speaking, the center of inclining motion of the vehicle body; i.e., the roll center, is located slightly below the road surface 18. However, in actuality, the roll center is considered to be located at a position approximately equal to that of the road surface 18.

It is desired that both the first lateral acceleration sensor 44*a* and the second lateral acceleration sensor 44*b* be attached to a member which is sufficiently high in rigidity. Also, since the difference between the detection values $a_1$ and $a_2$ decreases with the difference between $L_1$ and $L_2$, it is desired that the difference between $L_1$ and $L_2$ be sufficiently large, for example, 0.3 m or greater. Moreover, it is desired that both the first lateral acceleration sensor 44*a* and the second lateral acceleration sensor 44*b* be disposed above the link mechanism 30. Moreover, in the case where the vehicle body is supported by a spring such as a suspension, it is desired that both the first lateral acceleration sensor 44*a* and the second lateral acceleration sensor 44*b* be disposed on a so-called "sprung" side. Moreover, it is desired that both the first lateral acceleration sensor 44*a* and the second lateral acceleration sensor 44*b* be disposed between the axle of the front wheel 12F and the axles of the rear wheels 12L and 12R. Moreover, it is desired that both the first lateral acceleration sensor 44*a* and the second lateral acceleration sensor 44*b* be disposed at a position as close as possible to the occupant. Moreover, it is desired that both the first lateral acceleration sensor 44*a* and the second lateral acceleration sensor 44*b* be located on the center axis of the vehicle body which extends in the travel direction as viewed from the upper side; i.e., be not offset in a direction perpendicular to the travel direction.

In the present embodiment, a roll rate sensor 44*c* and a yaw rate sensor 44*d* are provided on the vehicle 10. The roll rate sensor 44*c* detects the angular velocity of inclining motion of the vehicle body. The yaw rate sensor 44*d* serves as yaw angular velocity detection means for detecting the yaw angular velocity of turn motion of the vehicle body; i.e., the yaw angular velocity of the vehicle body. Specifically, it is desired that both the roll rate sensor 44*c* and the yaw rate sensor 44*d* be located on the center axis of the vehicle body which extends in the travel direction as viewed from the upper side; i.e., be not offset in a direction perpendicular to the travel direction. For example, the roll rate sensor 44*c* and the yaw rate sensor 44*d* are disposed between the seat 11*a* and the foot rest 11*b*.

Notably, the roll rate sensor 44*c* is a common roll rate sensor which is composed of, for example, a gyro sensor which is mounted such that it can detect rotational angular velocity in a plane perpendicular to the road surface 18. Also, the yaw rate sensor 44*d* is a common yaw rate sensor which is composed of, for example, a gyro sensor which is mounted such that it can detect rotational angular velocity in a plane parallel to the road surface 18. Notably, a three-dimensional gyro sensor which can function as the roll rate sensor 44*c* and the yaw rate sensor 44*d* may be employed. Namely, the roll rate sensor 44*c* and the yaw rate sensor 44*d* may be formed separately or integrally formed as a single sensor unit.

The vehicle 10 according to the present embodiment includes a vehicle inclination control system, which is a portion of the control apparatus. The vehicle inclination control system is a computer system, and includes an inclination control apparatus composed of an ECU (Electronic Control Unit), etc. The inclination control apparatus includes computation means (a processer, etc.), storage means (a magnetic disc, semiconductor memory, etc.), an input/output interface, etc. The inclination control apparatus is connected to the link angle sensor 25*a*, the first lateral acceleration sensor 44*a*, the second lateral acceleration sensor 44*b*, the roll rate sensor 44*c*, the yaw rate sensor 44*d*, the vehicle speed sensor 54, and the link motor 25. The inclination control apparatus outputs a torque instruction value for operating the link motor 25.

When the vehicle 10 turns while travelling, the inclination control apparatus performs feedback control and feedforward control so as to operate the link motor 25 such that the inclination angle of the vehicle body becomes an angle at which the value of the lateral acceleration detected by the lateral acceleration sensor section 44 becomes zero. Namely, the inclination control apparatus controls the inclination angle of the vehicle body such that a balance is achieved between the centrifugal force toward the turning-locus outer side and the force of gravity, and the acceleration component in the lateral direction becomes zero. Thus, a force in a direction parallel to the vertical axis of the vehicle body acts on the vehicle body and the occupant in the cabin section 11. Accordingly, the stability of the vehicle body can be maintained, and the turning performance of the vehicle 10 can be improved.

Also, when the vehicle 10 receives a disturbance in the inclining direction, the inclination control apparatus extracts a portion of a change in the inclination angle of the vehicle body, which portion is attributable to the disturbance, controls the inclination angle of the vehicle body in an ordinary mode for the remaining portion, and controls the inclination angle of the vehicle body in a disturbance coping mode for the extracted portion. Accordingly, even when the vehicle 10 receives a disturbance, the stability of the vehicle body can be maintained. Also, the occupant does not feel an unnatural sensation, and the riding quality is improved.

Next, the configuration of the vehicle inclination control system will be described.

Figure 4:
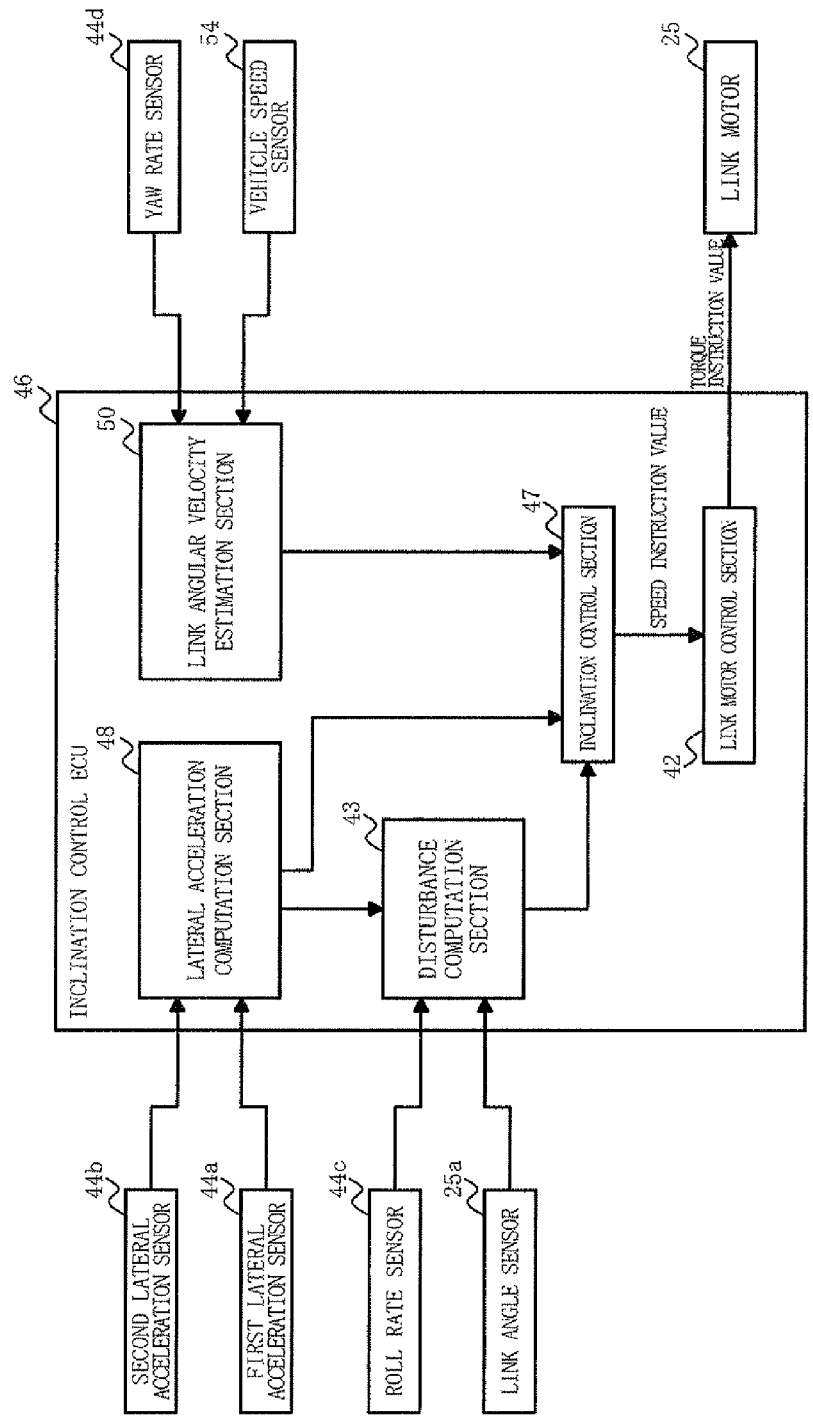
FIG. 4 Block diagram showing the configuration of a vehicle inclination control system according to the embodiment of the present invention.

FIG. 4 is a block diagram showing the configuration of the vehicle inclination control system according to the embodiment of the present invention.

In FIG. 4, reference numeral 46 denotes an inclination control ECU, which serves as the inclination control apparatus. The inclination control ECU 46 is connected to the link angle sensor 25*a*, the first lateral acceleration sensor 44*a*, the second lateral acceleration sensor 44*b*, the roll rate sensor 44*c*, the yaw rate sensor 44*d*, the vehicle speed sensor 54, and the link motor 25. The inclination control ECU 46 includes a lateral acceleration computation section 48, a link angular velocity estimation section 50, a disturbance computation section 43, an inclination control section 47, and a link motor control section 42.

The lateral acceleration computation section 48 calculates a combined lateral acceleration on the basis of the lateral accelerations detected by the first lateral acceleration sensor 44a and the second lateral acceleration sensor 44b. The link angular velocity estimation section 50 calculates a link angular velocity predicted value on the basis of the yaw rate (yaw angular velocity) which is detected by the yaw rate sensor 44d, and the vehicle speed detected by the vehicle speed sensor 54. The disturbance computation section 43 calculates a disturbing roll rate on the basis of the roll rate (the angular velocity of the inclining motion of the vehicle body) detected by the roll rate sensor 44c and the link angle detected by the link angle sensor 25a.

The inclination control section 47 computes and outputs a speed instruction value (control value) on the basis of the combined lateral acceleration calculated by the lateral acceleration computation section 48, the link angular velocity predicted value calculated by the link angular velocity estimation section 50, and the disturbing roll rate calculated by the disturbance computation section 43. On the basis of the speed instruction value output from the inclination control section 47, the link motor control section 42 outputs a torque instruction value (control value) for operating the link motor 25.

Next, operation of the vehicle 10 having the above-described configuration will be described. First, there will be described the operation of lateral acceleration computation processing, which is a portion of the operation of vehicle body inclination control processing performed during turn travel.

Figure 5:
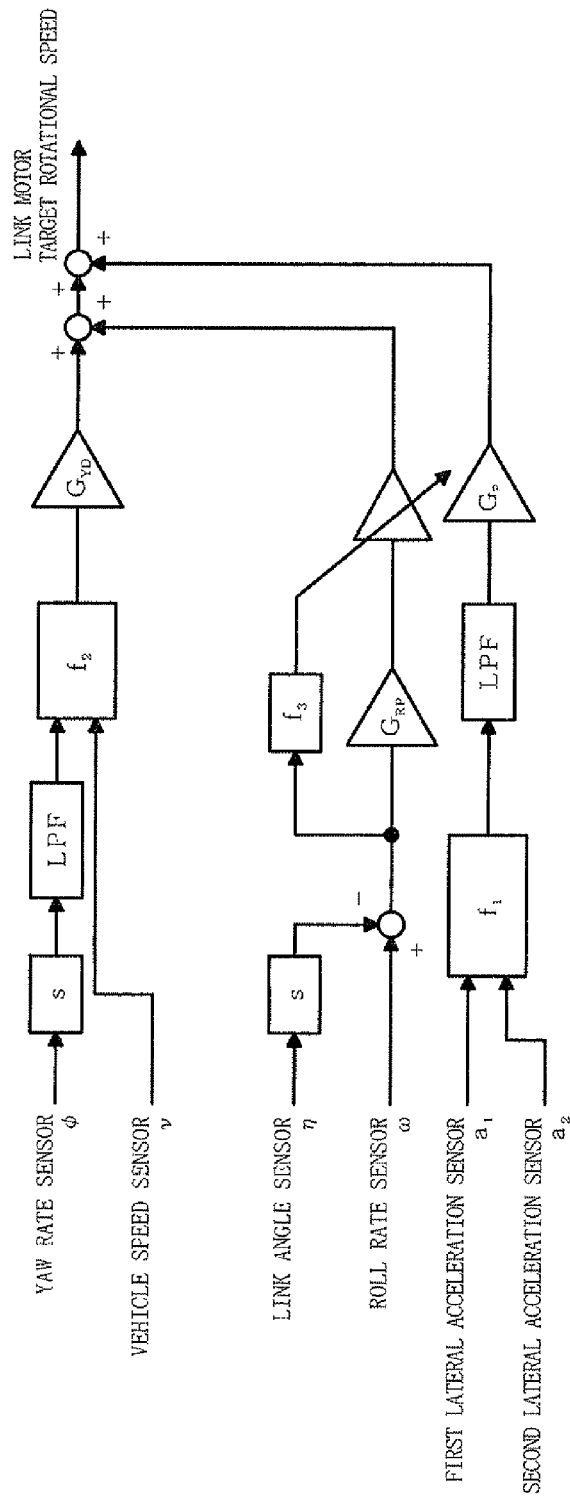
FIG. 5 Block diagram of a control system according to the embodiment of the present invention.
Figure 6:
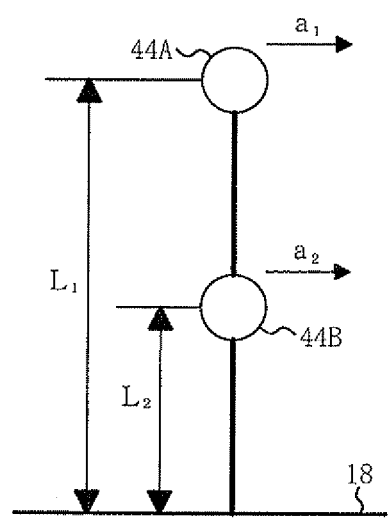
FIG. 6 Illustration relating to the embodiment of the present invention and showing a dynamic model used for describing an operation of inclining the vehicle body at the time of turn travel.
Figure 7:
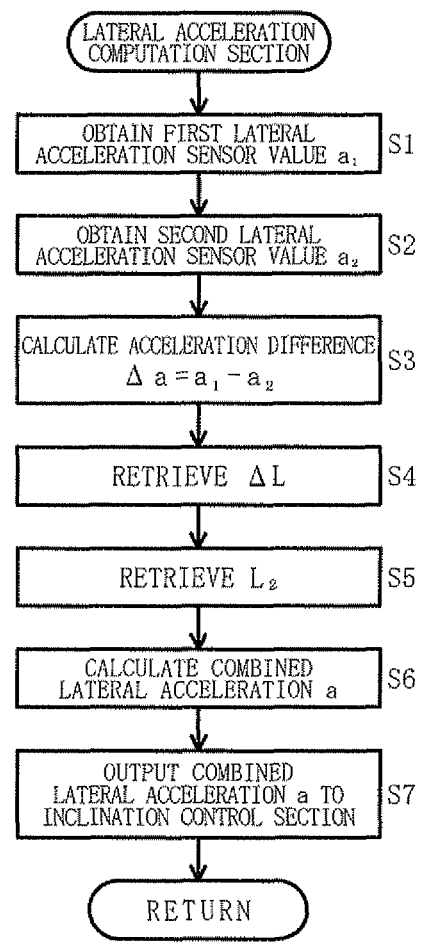
FIG. 7 Flowchart showing the operation of lateral acceleration computation processing according to the embodiment of the present invention.

FIG. 5 is a block diagram of the control system according to the embodiment of the present invention. FIG. 6 is an illustration relating to the embodiment of the present invention and showing a dynamic model used for describing an operation of inclining the vehicle body at the time of turn travel. FIG. 7 is a flowchart showing the operation of lateral acceleration computation processing according to the embodiment of the present invention.

In the vehicle body inclination control processing according to the present embodiment, a control which is realized by combining feedback control and feedforward control as shown in FIG. 5 is performed. In FIG. 5, $f_1$ is a transfer function represented by Equation (6) to be described later; $G_P$, $G_{RP}$, and $G_{YD}$ are control gains for proportional control operations; LPF is a low-pass filter; and s is a differentiating element. Also, $f_2$ is a link angular velocity predicted value represented by Equation (10) to be described later; and $f_3$ is a roll rate gain.

When turn travel is started, the vehicle body inclination control system starts the vehicle body inclination control processing. As a result of performance of attitude control, the vehicle 10 turns in a state in which, as shown in FIG. 3(b), the vehicle body is inclined toward the turning-locus inner side (the right side in the drawing) by the link mechanism 30. Also, at the time of turn travel, a centrifugal force toward the turning-locus outer side acts on the vehicle body, and the lateral direction component of the force of gravity is generated as a result of the vehicle body being inclined toward the turning-locus inner side. The lateral acceleration computation section 48 executes the lateral acceleration computation processing so as to calculate a combined lateral acceleration a and output it to the inclination control section 47. In response thereto, the inclination control section 47 performs feedback control and outputs the speed instruction value (control value) determined such that the value of the combined lateral acceleration a becomes zero. The link motor control section 42 outputs the torque instruction value to the link motor 25 on the basis of the speed instruction value output from the inclination control section 47.

Notably, the vehicle body inclination control processing is processing which is repeatedly executed by the vehicle body inclination control system at predetermined intervals $T_S$ (e.g., 5 ms) during a period during which the power supply of the vehicle 10 is on. The vehicle body inclination control processing is processing for improving the turning performance and making the occupant feel comfortable at the time of turning.

Notably, in FIG. 6, reference numeral 44A denotes a first sensor position showing the position on the vehicle body at which the first lateral acceleration sensor 44a is disposed, and reference numeral 44B denotes a second sensor position showing the position on the vehicle body at which the second lateral acceleration sensor 44b is disposed.

The first lateral acceleration sensor 44a and the second lateral acceleration sensor 44b detect four types of accelerations and outputs the detected accelerations. The four accelerations are <1> the centrifugal force acting on the vehicle body at the time of turning, <2> the lateral direction component of the force of gravity generated as a result of the vehicle body being inclined toward the turning-locus inner side, <3> an acceleration which is produced as a result of displacement of the first lateral acceleration sensor 44a and the second lateral acceleration sensor 44b in the circumferential direction, which displacement occurs due to, for example, deformation of springs, plays, or an inclination of the vehicle body caused as a result of falling of only one of the left and right wheels 12L and 12R into a hollow of the road surface 18, and <4> an acceleration which is produced as a result of displacement of the first lateral acceleration sensor 44a and the second lateral acceleration sensor 44b in the circumferential direction, which displacement occurs due to the operation of the link motor 25 or a reaction thereof. Of these four types of accelerations, the accelerations of <1> and <2> are irrelevant to the heights of the first lateral acceleration sensor 44a and the second lateral acceleration sensor 44b; i.e., $L_1$ and $L_2$. Meanwhile, since the accelerations of <3> and <4> are accelerations produced as a result of the displacement in the circumferential direction, they are proportional to the distance from the roll center; i.e., they are approximately proportional to $L_1$ and $L_2$.

The detected values of accelerations of <3> which are detected and outputted by the first lateral acceleration sensor 44a and the second lateral acceleration sensor 44b are represented by $a_{X1}$ and $a_{X2}$; and the detected values of accelerations of <4> which are detected and outputted by the first lateral acceleration sensor 44a and the second lateral acceleration sensor 44b are represented by $a_{M1}$ and $a_{M2}$. Also, the detected value of the acceleration of <1> which is detected and outputted by the first lateral acceleration sensor 44a and the second lateral acceleration sensor 44b is represented by $a_T$; and the detected value of the acceleration of <2> which is detected and outputted by the first lateral acceleration sensor 44a and the second lateral acceleration sensor 44b is represented by $a_G$. Notably, since the accelerations of <1> and <2> are irrelevant to the heights of the first lateral acceleration sensor 44a and the second lateral acceleration sensor 44b, the accelerations detected by the first lateral acceleration sensor 44a and the second lateral acceleration sensor 44b are equal to each other.

The angular velocity of the displacement in the circumferential direction which occurs due to, for example, deformation of springs, plays, or an inclination of the vehicle body caused as a result of falling of only one of the left and right wheels 12L and 12R into a hollow of the road surface 18 is represented by $\omega_R$, and its angular acceleration is represented by $\omega_R'$. Also, the angular velocity of the displacement in the circumferential direction which occurs due to the operation of the link motor 25 or its reaction is represented by $\omega_M$, and its angular acceleration is represented by $\omega_M'$. Notably, the angular velocity $\omega_M$ or the angular acceleration $\omega_M'$ can be obtained from the angle detected by the link angle sensor 25a.

The relations $a_{X1}=L_1\omega_R'$, $a_{X2}=L_2\omega_R'$, $a_{M1}=L_1\omega_M'$, and $a_{M2}=L_2\omega_M'$ are satisfied.

Also, the detected values of the accelerations detected by the first lateral acceleration sensor 44a and the second lateral acceleration sensor 44b are represented by $a_1$ and $a_2$. Since the detected accelerations $a_1$ and $a_2$ are the sum of the four types of accelerations of <1> to <4>, the accelerations $a_1$ and $a_2$ are represented by the following Equations (1) and (2).

$$a_1=a_T+a_G+L_1\omega_R'+L_1\omega_M' \quad \text{Equation (1)}$$

$$a_2=a_T+a_G+L_2\omega_R'+L_2\omega_M' \quad \text{Equation (2)}$$

The following Equation (3) can be obtained by subtracting Equation (2) from Equation (1).

$$a_1-a_2=(L_1-L_2)\omega_R'+(L_1-L_2)\omega_M' \quad \text{Equation (3)}$$

Since the values of $L_1$ and $L_2$ are the heights of the first lateral acceleration sensor 44a and the second lateral acceleration sensor 44b, they are known. Also, since the value of $\omega_M'$ is the derivative value of the angular velocity $\omega_M$ of the link motor 25, it is known. Therefore, only the value of the first term $\omega_R'$ of the right side of Equation (3) is unknown, and all the values of the remaining terms are known. Accordingly, the value of $\omega_R'$ can be obtained from the accelerations $a_1$ and $a_2$ detected by the first lateral acceleration sensor 44a and the second lateral acceleration sensor 44b. Namely, unnecessary acceleration components can be removed on the basis of the acceleration $a_1$ and $a_2$ detected by the first lateral acceleration sensor 44a and the second lateral acceleration sensor 44b.

When the vehicle body inclination control system starts the vehicle body inclination control processing, the lateral acceleration computation section 48 starts the lateral acceleration computation processing, and first obtains the first lateral acceleration sensor value $a_1$ (step S1) and the second lateral acceleration sensor value $a_2$ (step S2). Subsequently, the lateral acceleration computation section 48 calculates an acceleration difference $\Delta a$ (step S3). The acceleration difference $\Delta a$ is represented by the following Equation (4).

$$\Delta a=a_1-a_2 \quad \text{Equation (4)}$$

Subsequently, the lateral acceleration computation section 48 retrieves $\Delta L$ (step S4), and retrieves $L_2$ (step S5). $\Delta L$ is represented by the following Equation (5).

$$\Delta L=L_1-L_2 \quad \text{Equation (5)}$$

Subsequently, the lateral acceleration computation section 48 calculates the combined lateral acceleration a (step S6). Notably, the combined lateral acceleration a is a value corresponding to the lateral acceleration sensor value a detected by a lateral acceleration sensor section 44 composed of a single sensor, and is a value obtained by combining the first lateral acceleration sensor value $a_1$ and the second lateral acceleration sensor value $a_2$ in accordance with the following Equations (6) and (7).

$$a=a_2-(L_2/\Delta L)\Delta a \quad \text{Equation (6)}$$

$$a=a_1-(L_1/\Delta L)\Delta a \quad \text{Equation (7)}$$

Theoretically, the value obtained by Equation (6) is the same as that obtained by Equation (7). However, since the acceleration produced as a result of the displacement in the circumferential direction is proportional to the distance from the roll center, in actuality, it is desired that the acceleration detected by the sensor of the lateral acceleration sensor section 44 which is closer to the roll center; i.e., the acceleration $a_2$ detected by the second lateral acceleration sensor 44b be used as a reference. Therefore, in the present embodiment, the combined lateral acceleration a is calculated by Equation (6).

Finally, the lateral acceleration computation section 48 outputs the combined lateral acceleration a to the inclination control section 47 (step S7), and ends the lateral acceleration computation processing.

As described above, in the present embodiment, the first lateral acceleration sensor 44a and the second lateral acceleration sensor 44b are disposed at vertical positions which differ from each other; the combined lateral acceleration a is calculated by combining the first lateral acceleration sensor value $a_1$ and the second lateral acceleration sensor value $a_2$; and feedback control is performed so as to control the inclination angle of the vehicle body such that the value of the combined lateral acceleration a becomes zero.

Since unnecessary acceleration components can be removed by the above-described processing, the vehicle body inclination control system is not affected by the road surface condition and can prevent generation of vibration, divergence, etc. of the control system. Therefore, control responsiveness can be improved by increasing the control gain of the vehicle body inclination control system.

In the present embodiment, the lateral acceleration sensor section 44 includes two sensors. However, the number of the sensors of the lateral acceleration sensor section 44 may be three or more, so long as the lateral acceleration sensor section 44 includes a plurality of sensors disposed at different heights.

Next, there will be described then operation of link angular velocity estimation processing for estimating link angular velocity at the time of turn travel.

Figure 9:
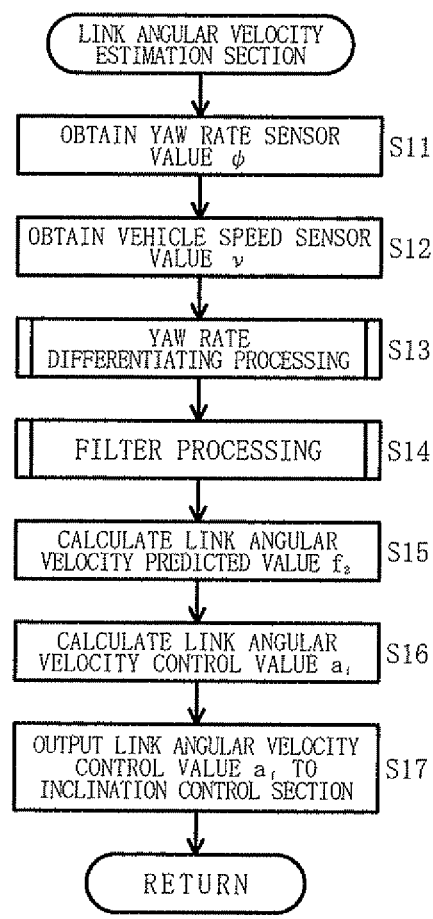
FIG. 9 Flowchart showing the operation of link angular velocity estimation processing according to the embodiment of the present invention.
Figure 10:
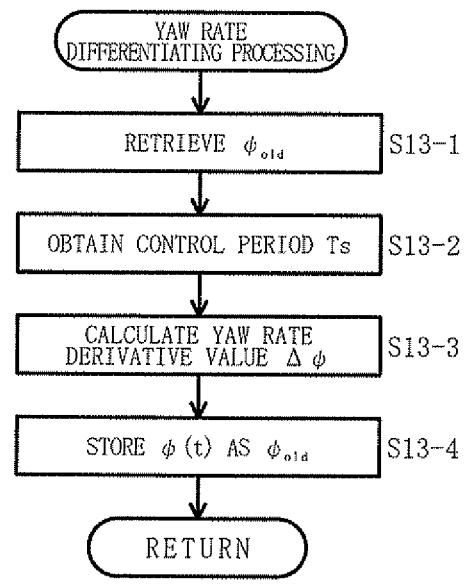
FIG. 10 Flowchart showing a yaw rate differentiating processing subroutine according to the embodiment of the present invention.
Figure 11:
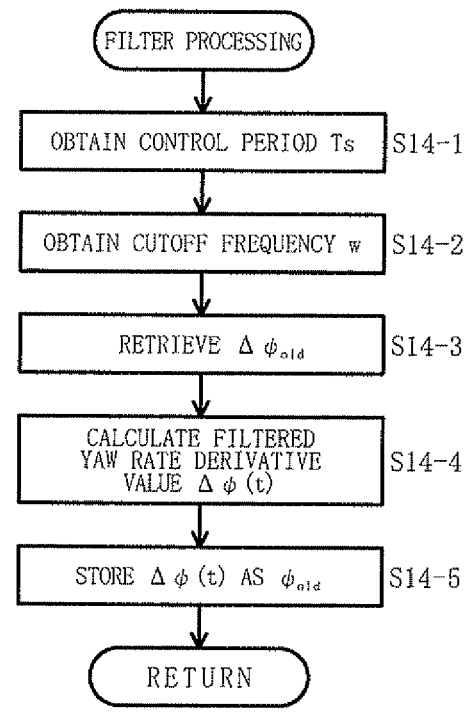
FIG. 11 Flowchart showing a filtering processing subroutine according to the embodiment of the present invention.

FIG. 8 is an illustration relating to the embodiment of the present invention and showing a model used for describing the link angle of the vehicle body. FIG. 9 is a flowchart showing the operation of the link angular velocity estimation processing according to the embodiment of the present invention. FIG. 10 is a flowchart showing a yaw rate differentiating processing subroutine according to the embodiment of the present invention. FIG. 11 is a flowchart showing a filtering processing subroutine according to the embodiment of the present invention.

When the link angular velocity estimation section 50 starts the link angular velocity estimation processing, it first obtains a yaw rate sensor value $\psi$, which is the value of the yaw rate detected by the yaw rate sensor 44d (step S11), and obtains a vehicle speed sensor value v, which is the value of the vehicle speed detected by the vehicle speed sensor 54 (step S12).

Subsequently, the link angular velocity estimation section 50 executes yaw rate differentiating processing (step S13) so as to obtain $\Delta\psi$. $\Delta\psi$ is the value obtained by differentiating the yaw rate with respect to time, and corresponds to the yaw angular acceleration.

In the yaw rate differentiating processing, the link angular velocity estimation section 50 first retrieves $\psi_{old}$ (step S13-1). Notably, $\psi_{old}$ is the value of $\psi(t)$ stored at the time of previous execution of the vehicle body inclination control processing. Notably, $\psi_{old}$ is set to zero by initial setting.

Subsequently, the link angular velocity estimation section 50 obtains the control period (interval) $T_S$ (step S13-2).

Subsequently, the link angular velocity estimation section 50 calculates a yaw rate derivative value $\Delta\psi$ (step S13-3). $\Delta\psi$ is calculated by the following Equation (8).

$$\Delta\psi = (\psi(t) - \psi_{old})/T_S \qquad \text{Equation (8)}$$

The link angular velocity estimation section 50 then stores $\psi(t)$ as $\psi_{old}$ (step S13-4), and ends the yaw rate differentiating processing.

Subsequently, the link angular velocity estimation section 50 performs filter processing for the yaw rate derivative value $\Delta\psi$ (step S14).

In the filter processing, the link angular velocity estimation section 50 first obtains the control period $T_S$ (step S14-1).

Subsequently, the link angular velocity estimation section 50 obtains a cutoff frequency w (step S14-2).

Subsequently, the link angular velocity estimation section 50 retrieves $\Delta\psi_{old}$ (step S14-3). Notably, $\Delta\psi_{old}$ is the value of $\Delta\psi(t)$ stored at the time of previous execution of the vehicle body inclination control processing.

Subsequently, the link angular velocity estimation section 50 calculates a filtered yaw rate derivative value $\Delta\psi(t)$ (step S14-4). $\Delta\psi(t)$ is calculated by the following Equation (9).

$$\Delta\psi(t) = \Delta\psi_{old}/(1+T_S w) + T_S w \psi/(1+T_S w) \qquad \text{Equation (9)}$$

Equation (9) is an equation representing an IIR (Infinite Impulse Response) filter which is commonly used as a band-pass filter, and represents a low-pass filter of a first-order lag type.

The link angular velocity estimation section 50 then stores $\Delta\psi(t)$ as $\Delta\psi_{old}$ (step S14-5), and ends the filter processing. Namely, the value of $\Delta\psi(t)$ calculated at the time of present execution of the vehicle body inclination control processing is stored in the storage means as $\Delta\psi_{old}$.

Subsequently, the link angular velocity estimation section 50 calculates the link angular velocity predicted value $f_2$ (step S15). When the force of gravity is represented by g, the link angular velocity predicted value $f_2$ is calculated by the following Equation (10).

$$f_2 = d\eta/dt = (v/g)(d\psi/dt) \qquad \text{Equation (10)}$$

As described above, the link angle sensor 25a detects a change in the angle of the upper lateral link unit 31U relative to the central vertical member 21; namely, a change in the link angle. Here, the link angle is represented by $\eta$, and the inclination angle of the vehicle body at the time of turning is assumed to be controlled such that a balance is achieved between the centrifugal force $a_0$, which a lateral acceleration, and the force of gravity g. If the road surface is horizontal, as shown in FIG. 8, the centrifugal force $a_0$ and the force of gravity g satisfy the relation represented by the following Equation (11).

$$a_0 \cdot \cos\eta = g \cdot \sin\eta \qquad \text{Equation (11)}$$

The following Equation (12) is derived from Equation (11)

$$a_0/g = \sin\eta/\cos\eta = \tan\eta \qquad \text{Equation (12)}$$

Further, the following Equation (13) is derived from Equation (12).

$$a_0 = g \cdot \tan\eta \qquad \text{Equation (13)}$$

Meanwhile, when the yaw rate is represented by $\psi$ and the turning radius is represented by r, the vehicle speed v and the centrifugal force (lateral acceleration) $a_0$ which acts on the vehicle body at the time of turning are represented by the following Equations (14) and (15).

$$v = r\psi \qquad \text{Equation (14)}$$

$$a_0 = r\psi^2 = v\psi \qquad \text{Equation (15)}$$

The following Equation (16) is derived from Equations (15) and (13).

$$\tan\eta = v\psi/g \qquad \text{Equation (16)}$$

Further, the approximation of $\tan\eta \approx \eta$ is possible, and a change in the vehicle speed v is sufficiently slow as compared with a change in the link angle $\eta$. Therefore, the vehicle speed v can be considered as a constant, and Equation (10) can be obtained from Equation (16).

Subsequently, the link angular velocity estimation section 50 calculates a link angular velocity control value $a_f$ (step S16). The link angular velocity control value $a_f$ is calculated by the following Equation (17).

$$a_f = A d\eta/dt \qquad \text{Equation (17)}$$

A is an arbitrary value between 0 to 1 and is a tuning constant determined in accordance with the structure of the vehicle 10.

Finally, the link angular velocity estimation section 50 outputs the link angular velocity control value $a_f$ to the inclination control section 47 (step S17), and ends the link angular velocity estimation processing.

Next, there will be described the operation of inclination control processing for outputting the speed instruction value to the link motor control section 42.

Figure 12:
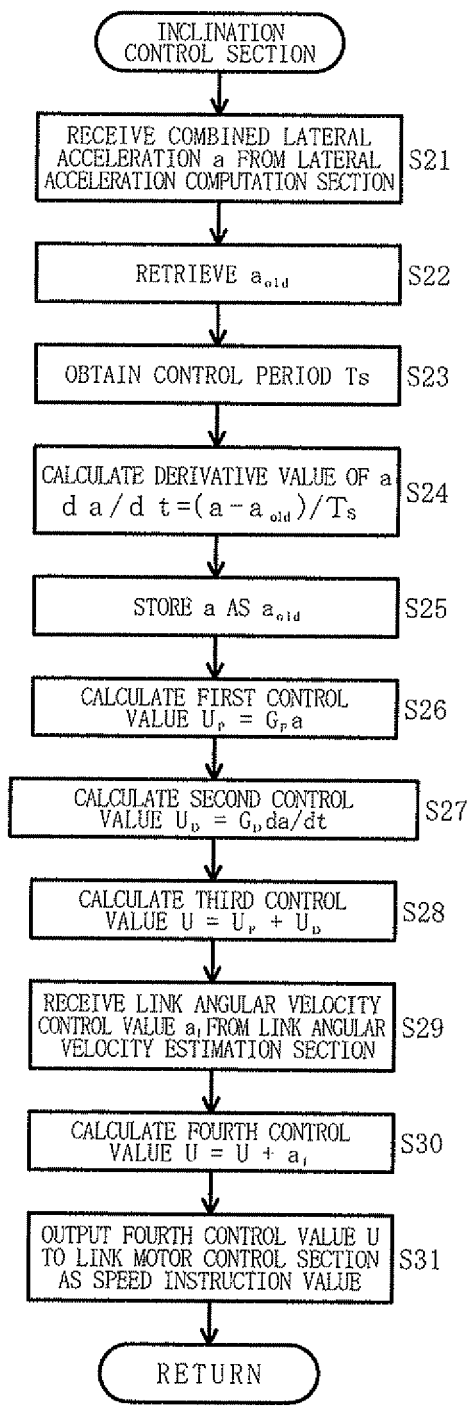
FIG. 12 Flowchart showing the operation of inclination control processing according to the embodiment of the present invention.

FIG. 12 is a flowchart showing the operation of the inclination control processing according to the embodiment of the present invention.

In the inclination control processing, the inclination control section 47 first receives the combined lateral acceleration a from the lateral acceleration computation section 48 (step S21).

Subsequently, the inclination control section 47 retrieves $a_{old}$ (step S22). $a_{old}$ is the combined lateral acceleration a stored at the time of previous execution of the vehicle body inclination control processing. Notably, $a_{old}$ is set to zero by initial setting.

Subsequently, the inclination control section 47 obtains the control period $T_S$ (step S23), and calculates the derivative value of a (step S24). When the derivative value of a is represented by da/dt, da/dt is calculated by the following Equation (18)

$$da/dt = (a - a_{old})/T_S \qquad \text{Equation (18)}$$

The inclination control section 47 then stores a as $a_{old}$ (step S25). Namely, the lateral acceleration sensor value a obtained at the time of present execution of the vehicle body inclination control processing is stored in the storage means as $a_{old}$.

Subsequently, the inclination control section 47 calculates a first control value $U_P$ (step S26). When a control gain used for proportional control operation; i.e., a proportional gain, is represented by $G_P$, the first control value $U_P$ is calculated by the following Equation (19).

$$U_P = G_P a \qquad \text{Equation (19)}$$

Subsequently, the inclination control section 47 calculates a second control value $U_D$ (step S27). When a control gain used for derivative control operation; i.e., a derivative time, is represented by $G_D$, the second control value $U_D$ is calculated by the following Equation (20).

$$U_D = G_D da/dt \qquad \text{Equation (20)}$$

Subsequently, the inclination control section 47 calculates a third control value U (step S28). The third control value U is the sum of the first control value $U_P$ and the second control value $U_D$, and is calculated by the following Equation (21).

$$U = U_P + U_D \qquad \text{Equation (21)}$$

Upon completion of the calculation of the third control value U, the inclination control section 47 receives the link angular velocity control value $a_f$ from the link angular velocity estimation section 50 (step S29).

Subsequently, the inclination control section 47 calculates a fourth control value U (step S30). The fourth control value U is the sum of the third control value U and the link angular velocity control value $a_f$, and is calculated by the following Equation (22).

$$U = U + a_f \qquad \text{Equation (22)}$$

Finally, the inclination control section 47 outputs the fourth control value U to the link motor control section 42 as a speed instruction value (step S31), and ends the processing.

Next, there will be described the operation of link motor control processing for outputting the torque instruction value to the link motor 25.

Figure 13:
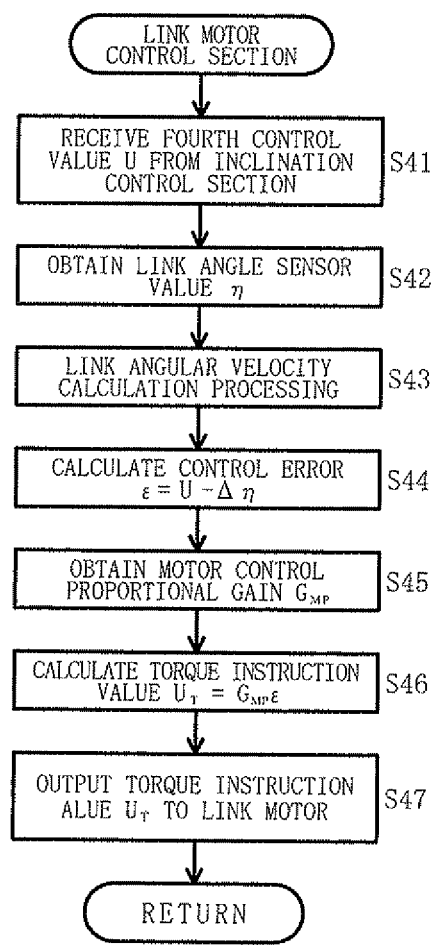
FIG. 13 Flowchart showing the operation of link motor control processing according to the embodiment of the present invention.

FIG. 13 is a flowchart showing the operation of the link motor control processing according to the embodiment of the present invention.

In the link motor control processing, the link motor control section 42 first receives the fourth control value U from the inclination control section 47 (step S41).

Subsequently, the link motor control section 42 obtains the link angle sensor value η detected by the link angle sensor 25*a* (step S42), and executes link angular velocity calculation processing (step S43) so as to calculate the angular velocity Δη of the link angle of the link mechanism 30.

The link motor control section 42 can omit the operations of the above-mentioned steps S42 and S43 by obtaining the value of Δη from the disturbance computation section 43.

Subsequently, the link motor control section 42 calculates a control error (step S44). With the control error being represented by ε, the control error ε is calculated by the following Equation (23).

$$\epsilon = U - \Delta\eta \qquad \text{Equation (23)}$$

Notably, U is the fourth control value received from the inclination control section 47.

Subsequently, the link motor control section 42 obtains a motor control proportional gain $G_{MP}$ (step S45). The value of the motor control proportional gain $G_{MP}$ is set by an experiment or the like, and is stored in the storage means in advance.

Subsequently, the link motor control section 42 calculates the torque instruction value for operating the link motor 25 (step S46). When the torque instruction value is represented by $U_T$, $U_T$ is calculated by the following Equation (24).

$$U_T = G_{MP}\epsilon \qquad \text{Equation (24)}$$

Finally, the link motor control section 42 outputs the torque instruction value $U_T$ to the link motor 25 (step S47), and ends the processing.

As described above, in the present embodiment, the first lateral acceleration sensor 44*a* and the second lateral acceleration sensor 44*b* are disposed at vertical positions which differ from each other, and the combined lateral acceleration a is calculated by combining the first lateral acceleration sensor value $a_1$ and the second lateral acceleration sensor value $a_2$, and the inclination angle of the vehicle body is controlled on the basis of the value of the combined lateral acceleration a.

Since unnecessary acceleration components can be removed by the above-described processing, it is possible to eliminate the influence of the road surface condition and prevent the generation of vibration, divergence, etc. of the control section. Therefore, control responsiveness can be improved by increasing the control gain of the vehicle body inclination control system. Also, even when the road surface 18 inclines in a direction perpendicular to the travel direction, the vehicle body can be maintained in an attitude perpendicular to the road surface 18. Accordingly, the stability of the vehicle body can be maintained, and the turning performance can be improved. In addition, it becomes possible to realize a stable travel state in which the occupant does not feel an unnatural sensation, and can enjoy a comfortable ride.

Moreover, since the link angular velocity predicted value is used for the vehicle body inclination control, it is possible to eliminate control delay, which would otherwise is produced when the change of the lateral acceleration is large, for example, when a turning operation is started or ended.

Moreover, since the link angular velocity predicted value is calculated from the yaw rate rather than the steering angular velocity, predication accuracy can be improved although immediacy is somewhat sacrificed. For example, in the case of counter steer, the steering angle changes in a direction opposite the turning direction. Therefore, if the link angular velocity is predicted on the basis of the steering angular velocity, an unintended vehicle body inclination is produced. However, such an unintended inclination can be avoided by predicting the link angular velocity on the basis of the yaw rate.

Also, since the yaw rate can be detected by the yaw rate sensor 44*d* such that the detected value contains all the influences of yaw rate gain, control delay, friction coefficient of road surface, etc., the computation amount of the inclination control ECU 46 can be suppressed.

The present invention is not limited to the above-described embodiment. Numeral modifications and variations of the present invention are possible in light of the spirit of the present invention, and they are not excluded from the scope of the present invention.

Industrial Applicability

The present invention can be applied to a vehicle which has at least one pair of left and right wheels.

Description of Symbols

10: vehicle
11: cabin section
12F, 12L, 12R: wheel
20: main body section
25: link motor
44: lateral acceleration sensor section
44*a*: first lateral acceleration sensor
44*b*: second lateral acceleration sensor
44*d*: yaw rate sensor
54: vehicle speed sensor

The invention claimed is:

1. A vehicle characterized by comprising:
a vehicle body which includes a steering section and a drive section connected together;
a steerable wheel which is rotatably mounted to the steering section and which steers the vehicle body;
a drive wheel which is rotatably mounted to the drive section and which drives the vehicle body;
an inclination actuator apparatus for inclining the steering section or the drive section in a turning direction;
a plurality of sensors which detect lateral accelerations acting on the vehicle body;
yaw angular velocity detection means for detecting yaw angular velocity of the vehicle body;
vehicle speed detection means for detecting vehicle speed; and
a control apparatus which controls the inclination of the vehicle body by controlling the inclination actuator apparatus, wherein the control apparatus performs feedback control on the basis of the lateral accelerations detected by the plurality of sensors, calculates a link angular velocity predicted value from a derivative value of the yaw angular velocity detected by the yaw angular velocity detection means and the vehicle speed detected by the vehicle speed detection means, and controls the inclination of the vehicle body by performing feedforward control while using the calculated link angular velocity predicted value.

2. A vehicle according to claim 1, wherein the control apparatus controls the inclination of the vehicle body such that a combined lateral acceleration obtained by combining the lateral accelerations detected by the plurality of sensors becomes zero.

3. A vehicle according to claim 1, wherein the plurality of sensors are lateral acceleration sensors disposed at vertical positions which differ from each other.

4. A vehicle according to claim 2, wherein the plurality of sensors are lateral acceleration sensors disposed at vertical positions which differ from each other.

* * * * *